May 24, 1949. H. L. KINDORF ET AL 2,470,991
ADJUSTABLE BEAM CLAMP
Filed Jan. 13, 1948
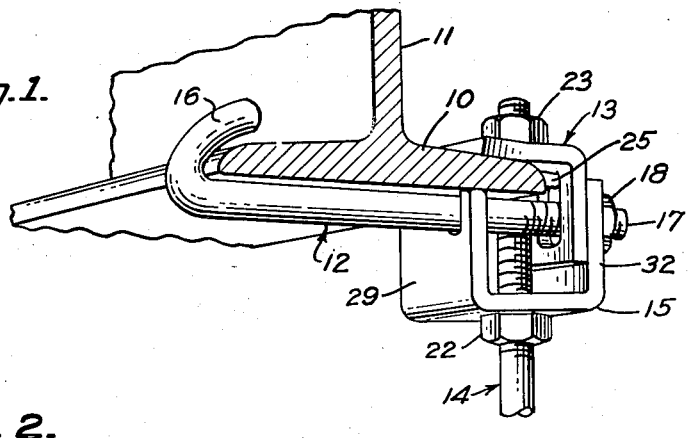
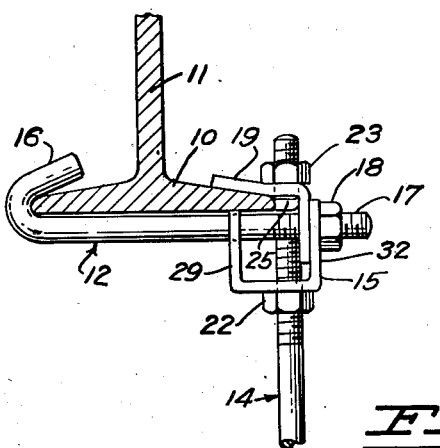
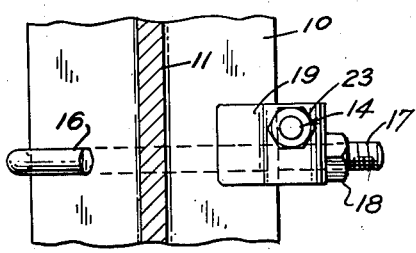
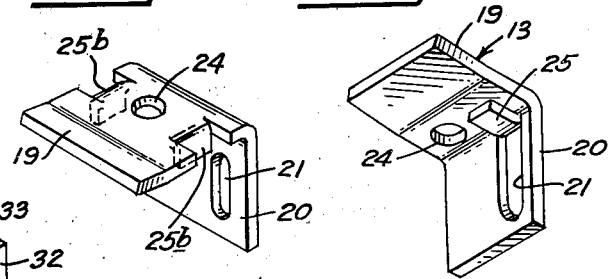
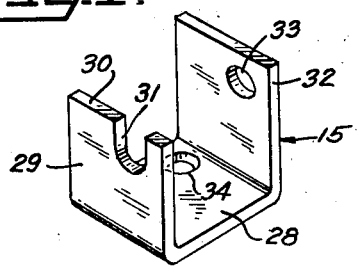
INVENTOR.
HARRY L. KINDORF
ORLAN C. KINDORF
BY
Charles M Fryer
ATTORNEY Patented May 24, 1949

2,470,991

UNITED STATES PATENT OFFICE 2,470,991

ADJUSTABLE BEAM CLAMP

Harry L. Kindorf and Orlan C. Kindorf,
San Francisco, Calif.

Application January 13, 1948, Serial No. 2,054

6 Claims. (Cl. 248—72)

1

This invention relates to beam clamps and particularly to an adjustable clamp of the kind employed in supporting cables, conduits or other apparatus or fixtures with relation to an overhead beam. Many overhead beams in buildings and ships are of the cross-sectional type known as I-beams and present a horizontal two edged flange part from which overhead pipe and cables can be supported. It is common practice to provide beam clamps engageable with the edges of the beam flange to provide such support. Most such clamps, however, must be provided in many different sizes to accommodate the different sized beams and they are relatively complicated and costly to manufacture.

It is an object of the present invention to provide a very simple and inexpensive beam clamp capable of adjustment to fit beams of many different sizes and to provide a beam clamp that is easily applied and exceptionally strong. Other objects and advantages of the invention and the manner in which the invention is carried into practice are made apparent in the following specification wherein reference is made to the accompanying drawings.

In the drawings:

Fig. 1 is an isometric view of a beam clamp embodying the present invention shown in place upon the lower flange of an I-beam, a fragment of which is illustrated.

Fig. 2 is a front elevation of the beam clamp in place upon the I-beam, the lower portion of which is shown in section.

Fig. 3 is a plan view of the clamp as it is shown in Fig. 2.

Fig. 4 is an isometric view of a clamping bracket which forms a part of the beam clamp.

Fig. 5 is a similar view of a hook plate also forming a part of the clamp and

Fig. 6 is an isometric view of a modified form of the hook plate shown in Fig. 5.

As shown in Figs. 1 and 2, the beam clamp of the present invention is adapted for securement to the lower flange 10 of an I-beam or the like which beam also comprises a web portion 11 and an upper flange (not shown), but similar to the flange 10. The beam clamp comprises a threaded hook rod 12, a hook plate 13, also shown in Fig. 5, a combined clamping bolt and hanger rod 14 and a clamping bracket 15 also shown in Fig. 4.

The threaded hook rod has a hook 16 at one end engageable over one edge of the flange 10 of the I-beam and the main portion of the rod extends transversely beneath the I-beam. The opposite end 17 of the hook rod is threaded for reception

2 of a nut 18. The hook plate 13 is of right angular shape and has a flat portion 19 disposed generally parallel to the rod 12 and a flat portion 20 disposed at right angles to the part 19 with an elongated opening 21 through which the threaded end of the hook rod extends. The opening 21 is elongated to permit vertical adjustment of the hook plate and thereby to accommodate I-beam flanges of different thickness as the nut 18 is tightened on the threaded end of the hook rod to bring the hook plate into the flange engaging position illustrated in Figs. 1, 2 and 3.

The combined clamping bolt and hanger rod 14 is provided with two nuts 22 and 23 on its upper threaded end and the nut 23 is turned downwardly into engagement with the hook plate to bring it into close contact with the upper surface of flange 10. The clamping bolt and hanger rod 14 extends through a perforation 24 in the part 19 of the hook plate and engages with the outermost edge of the I-beam flange 10. There is a tendency, therefore, when the hook rod nut 18 is tightened, to twist the hook plate toward angular position out of alinement with the hook rod. To prevent this, a lug 25, as illustrated in Fig. 5, is formed beneath the part 19 of the hook plate also to engage the flange of the I-beam as clearly shown in Fig. 2. For convenience and to reduce the cost of manufacture, the lug 25 may be formed by bending inwardly a portion of the material removed during the formation of the slot 21. As both the lug 25 and the clamping bolt and hanger rod 14 engage the edge of the flange 10 with the hook plate in its proper position, tightening of the rod 18 will not tend to twist it to an angular position. A modified form of the hook plate shown in Fig. 5 is illustrated in Fig. 6. In this figure the angular hook plate has the same perforation 24 and elongated opening 21 but two lugs 25a and 25b are bent downwardly from the edges of the part 19 to engage the edge of the I-beam flange instead of the lug 25 of Fig. 5.

The clamping bracket 15 is of U-shaped cross section having a horizontally disposed flat portion 28 and an inner upstanding portion 29 with an edge 30 engageable with the bottom of the flange 10 and a notch 31 formed in said edge for the reception of the threaded hook rod. The clamping bracket also has an upstanding portion 32 perforated as shown at 33 for the reception of the threaded hook rod, the perforation 33 being alined with the notch 31. The horizontal portion 28 of the clamping bracket is perforated as at 34 to permit the clamping bolt and hanger rod 14 to pass therethrough and the nut 22 on the clamping bolt and hanger rod is drawn upwardly against the bottom of the horizontal portion. The lower end of the combined clamping bolt and hanger rod 14 is not shown in the present drawing but may be in the form of a threaded rod, hook, or any other shape convenient for supporting brackets, pipe hangers or other equipment to be suspended from the adjustable beam clamp. When the nut 18 is tightened, the hook plate and hooked-end 16 of the hook rod are drawn into close engagement with the opposite edges of the beam flange 10, while tightening of the nuts 22 and 23 insures that the hook plate is drawn tightly against the upper portion of the beam flange.

A beam clamp constructed in the manner herein illustrated is extremely simple to manufacture as it consists of no more than two threaded rods and two members formed of strap iron bent and perforated as by simple punch press operations. It is, however, adjustable for adaption to beams of various sizes as it is simply necessary to tighten the nut 18 on the threaded end 17 to accommodate I-beams with narrow flanges and to adjust the nut 23 to compensate for differences in thickness of the I-beam flanges.

We claim:

1. A beam clamp comprising a rod having a hooked end engageable over one edge of a beam flange, a hook plate slidable on the rod to engage the opposite edge of the flange, a nut threaded on the rod to urge the hook plate toward the flange edge, and means to urge the hook plate toward the rod and into firm contact with the flange.

2. A beam clamp comprising a rod having a hooked end engageable over one edge of a beam flange, a hook plate slidable on the rod to engage the opposite edge of the flange, a nut threaded on the rod to urge the hook plate toward the flange edge, and means to urge the hook plate toward the rod and into firm contact with the flange, said means comprising a threaded rod disposed at right angles to the hook rod and having nuts thereon.

3. A beam clamp comprising a rod having a hooked end engageable over one edge of a beam flange, a hook plate slidable on the rod to engage the opposite edge of the flange, a nut threaded on the rod to urge the hook plate toward the flange edge, and means to urge the hook plate toward the rod and into firm contact with the flange said means comprising a clamping bracket and a threaded rod extending through the clamping bracket and the hook plate.

4. A beam clamp comprising a rod having a hooked end engageable over one edge of a beam flange, a hook plate slidable on the rod to engage the opposite edge of the flange, a nut threaded on the rod to urge the hook plate toward the flange edge, and means to urge the hook plate toward the rod and into firm contact with the flange, said means comprising a clamping bracket and a threaded rod extending through the clamping bracket and the hook plate, said threaded rod extending downwardly to provide a hanger for articles to be suspended from the beam clamp.

5. A beam clamp comprising a rod having a hooked end engageable over one edge of a beam flange, an angular plate having a perforation to receive said rod and to form a hook therewith engageable with the opposite edge of the beam flange, a hanger rod extending through said plate at right angles to the first rod and engageable with the edge of the flange, and a lug carried by the angular plate and engaging the same edge to prevent twisting of the plate as it is urged toward the flange.

6. A beam clamp comprising a rod having a hooked end engageable with an edge of a beam flange and a threaded end, an angular plate slidable on the threaded end to overlay the opposite edge of said flange, a nut on the rod to urge the plate toward the flange, a U-shaped clamping bracket also slidable on the rod and having an edge engageable with the flange, a threaded rod extending at right angles to the hooked rod and through the angular plate and the clamping bracket, and nuts on said threaded rod to draw said plate and bracket against opposite sides of the flange.

HARRY L. KINDORF.
ORLAN C. KINDORF.

REFERENCES CITED

The following references are of record in the file of this patent:

UNITED STATES PATENTS

| Number | Name | Date |
|---|---|---|
| 1,652,695 | Barber | Dec. 13, 1927 |
| 1,795,808 | Thompson | Mar. 10, 1931 |
| 1,976,595 | Asleson et al. | Oct. 9, 1934 |